Nov. 9, 1965 D. E. HUSBY ETAL Re. 25,900

LUMINAIRE

Original Filed Nov. 13, 1958 7 Sheets-Sheet 1

WITNESSES:

Bernard R. Giegner

A. R. Field

INVENTORS

Donald E. Husby, Clem W. Eberhart and Edmund L. Izzi.

BY

Donald D. Smith

ATTORNEY

LUMINAIRE

Original Filed Nov. 13, 1958 7 Sheets-Sheet 2

LUMINAIRE

Original Filed Nov. 13, 1958 7 Sheets-Sheet 6

United States Patent Office

Re. 25,900
Reissued Nov. 9, 1965

25,900
LUMINAIRE

Donald E. Husby, Fairview Park, Clem W. Eberhart, Avon Lake, and Edmund L. Izzi, North Olmsted, Ohio, assignors to Westinghouse Electric Corporation, East Pittsburgh, Pa., a corporation of Pennsylvania Original No. 3,065,338, dated Nov. 20, 1962, Ser. No. 773,789, Nov. 13, 1958. Application for reissue Nov. 16, 1964, Ser. No. 427,522
23 Claims. (Cl. 240—25)

Matter enclosed in heavy brackets [ ] appears in the original patent but forms no part of this reissue specification; matter printed in italics indicates the additions made by reissue.

This invention relates generally to lighting fixtures and more particularly to a luminaire which is employed in street lighting applications.

While lighting fixtures of this general type have been used in the past, the ballast or transformer required to operate a mercury vapor lamp has not been included in the assembly of a mercury vapor lighting fixture, particularly a power factor corrected ballast or transformer, as the weight and the volume that would be occupied by the ballast or transformer has been prohibitive. In addition, the heat generated by the components has been a factor seriously limiting development of a luminaire having the components thereof closely associated with the basic lighting system which in itself generates a large amount of heat. Additionally, it has been difficult to design a low cost luminaire incorporating all of the associated components so that they are easily removable and still obtain a pleasing outer configuration. In order to eliminate these and associated problems, we have designed a new and improved luminaire which utilizes a mercury vapor lamp and has a novel form of housing so that all of the luminaire component elements, including the aforementioned ballast or transformer, may be mounted therein, and includes a novel latch mechanism and a closure assembly which positions the reflector.

One object of this invention, therefore, is to provide a luminaire having a novel form of housing to enclose internally all of the functioning components utilized, therein, in a mercury vapor lamp luminaire.

Another object of this invention is to provide a luminaire of the type described in which the housing forms a support to which all of the functional component elements are mounted therein in a novel manner.

Still another object of this invention is to provide a luminaire of the type described wherein the refector is mounted substantially within the housing, with the bottom periphery of the reflector engaging the periphery of the aperture in the closure assembly in a novel manner when the closure assembly is in its closed or operative position.

A further object of this invention is to provide a luminaire of the type described having a novel unitary reflector construction easily mounted in position and which is positively aligned within the housing when the bottom closure assembly in its closed or operative position.

Still a further object of this invention is to provide a luminaire having a closure assembly which is hingedly mounted to the luminaire in a novel manner so that the closure assembly can be rotated downwardly thereby exposing all the components of the luminaire.

A further object of this invention is to provide a novel luminaire which has a bottom closure assembly which must be rotated beyond its free hanging open position before it can be removed from the luminaire housing, thereby preventing accidental removal.

A more specific object of this invention is to provide a novel luminaire having a unitary housing and mounting means, and a unitary closure assembly which is hingedly mounted to the housing and which is latched into its closed operative position by a recessed latch, thereby providing a smooth contoured surface.

Still another specific object of this invention is to provide a luminaire employing an elongated unitary housing containing the ballast or transformer and other components therein, while keeping the size of the luminaire at a minimum.

These and other objects of this invention will become more apparent upon consideration of the following detailed description of illustrative embodiments thereof, when taken in connection with the attached drawings, in which.

While the invention is herein specifically described as embodied in a street lighting type of luminaire, it should be understood at the outset that the invention in its various aspects can be readily adapted to other types of luminaires than that exemplified herein, and consequently, the following descriptive matter is not intended as limiting with respect to any of the features of this invention.

Figures 1, 14:
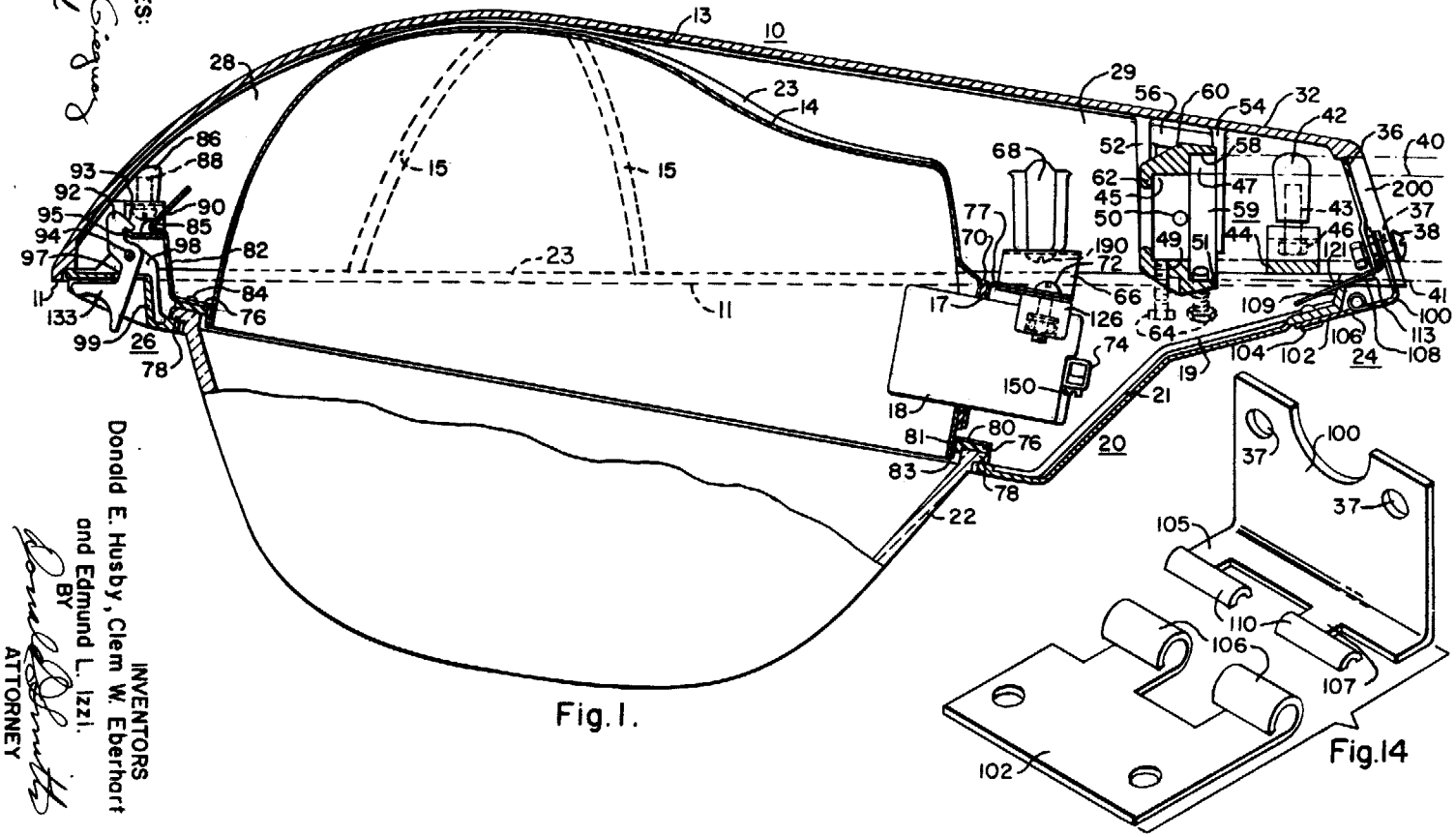
FIGURE 1 is a side elevation view of a luminaire constructed in accordance with this invention, with certain of the parts shown in section.
FIG. 14 is an exploded view of the hinge hanger and refractor ringe hinge mechanism constructed in accordance with this invention.

The luminaire shown in FIG. 1 of the drawings is depicted as having a housing 10 which is generally of shallow inverted dish-shape to give it a relatively flat silhouette. The portion of the housing 10 adjacent to the inverted dish-shaped ovate reflector 14 slopes forward at the outer end to intersect flat horizontal base surface or rim 11 at a relatively small angle. The outer end of the base surface 11 of the housing 10 is substantially semicircular so as to accommodate the reflector 14 when it is in its mounted operative position. The housing 10 has substantially straight sides 29 gradually converging from its largest diameter to the inner end of housing slipfitter portion 32 which is the portion of the housing 10 that is attached to the pipe support 40 or 41. The housing slipfitter portion 32 is of an inverted U-shape with the downwardly extending legs integrally forming the side walls 29 of the housing slipfitter portion 32. Due to the convergence of the sides 29 of the housing slipfitter portion 32 from the point where they are integrally joined to housing side wall 28, the housing 10 has a plan view (not shown), of a generally teardrop shape. The housing 10 may be made of any suitable material, but preferably is formed of aluminum. It will readily be seen that the housing slipfitter portion 32 has a greater cross-sectional area at a point immediately adjacent the reflector 14 than it does at its outermost end.

Integrally cast on the upper inner surface of the housing 10 is a central longitudinal stiffening rib 13 extending from the base surface 11 at the outer end of the housing 10 to a point adjacent the rearmost portion of the housing slipfitter portion 32. As shown in FIG. 1 of the drawings, lateral ribs 15 can extend downwardly at each inner side of the housing 10, from rib 13 to the base surface 11, to thereby further stiffen and reinforce the walls of the housing 10. In addition, the reflector 14, as shown in FIG. 1, has a longitudinal groove 23 extending substantially the length of the ovate reflector 14. The reflector 14 is mounted, within the housing 10, as described hereinbelow so that a portion of its upper, exterior surface rests against a portion of the lateral ribs 15 with the longitudinal rib 13 engaging the longitudinal groove 23 to positively position the reflector 14 within the housing 10 and also to limit the upward travel of the reflector 14 after insertion into the housing 10.

A refractor ring 20, as shown in FIG. 1, is mounted to the lower outer end of the housing slipfitter portion 32 by a hinge assembly 24. The refractor ring 20 is latched to the opposite end of the housing 10 by a latch assembly 26. The refractor ring 20, which is made of any suitable material such as cast aluminum, is likewise dish-shaped in order to close the lower opening of the housing 10 and slipfitter portion 32. The refractor ring 20 has a bottom opening suitable for mounting an ovate refractor or other light transmitting member 22 and the opening is inclined from the relatively shallow outer end to a relatively deeper point spaced from the inner end thereof in such a manner that when the refractor 22 is mounted in the refractor ring 20, the refractor 22 is angularly displaced downwardly from the latch assembly 26 relative to the longitudinal center line of the luminaire housing 10. Closure portion 21 of the refractor ring 20 has integral spaced ribs 19 extending longitudinally along its inner surface, to reinforce the closure portion 21. Closure portion 21 has a rim 23 about its periphery engaging or mating with the rim portion 11 around the bottom opening of the housing 10 when the closure portion is in its operative closed position.

Extending downwardly and inwardly from the top and side walls of the housing slipfitter portion 32 at its outer end and generally at right angles thereto is a mounting flange 200 which is formed integrally with the housing 10. The mounting flange 200 is shaped at the top to accommodate a semicircular shape such as the upper half of a circular pipe support 41. As shown in FIG. 1, a semicircular adapter plate 36 as well as a hinge hanger 100 and leaf spring 123 can be fastened to the inner side of the mounting flange 200 at the bottom by nut, bolt and lock washer assemblies 38 at the lower ends thereof. If desirable, the adapter plate 36 can be mounted to the housing rear flange 200 so as to accommodate a smaller size pipe support, as indicated by dashed lines 40.

Figure 4:
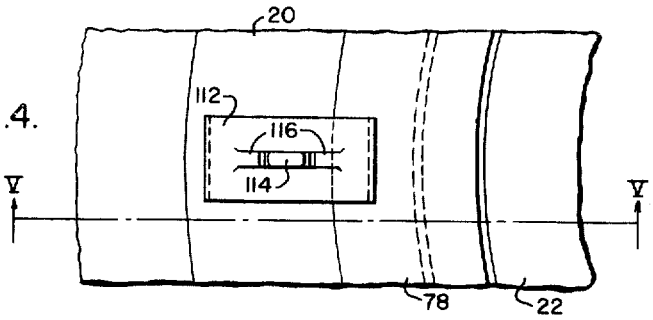
FIG. 4 is a top plan view of a part of the refractor and ring illustrating a clip securing the refractor to the closure assembly.
Figure 5:
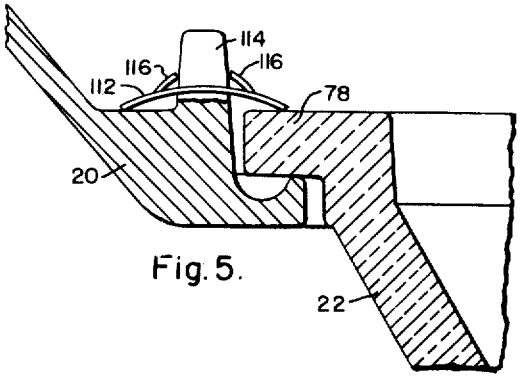
FIG. 5 is a cross-sectional view of a part of the globe and ring showing the clip of FIG. 4, taken substantially along the line V—V thereof.

As shown in FIGS. 1, 4 and 5 of the drawings, a bowl-shaped ovate refractor 22 having an integral circumferential outwardly extending flange 78 is adapted to be received in the refractor opening of the refractor ring 20, with the flange 78 being seated on the upper side of the ring. The ovate refractor 22 can be securely mounted by refractor ring clips 112. The refractor can be made of any suitable transparent material, such as glass. Integrally formed on the inner surface of the refractor ring 20 and spaced about the circumference of the opening which accommodates the refractor 22, are several upwardly extending projections 114. The clips 112 are of a resilient material, such as spring steel, and are generally rectangular in shape with a longitudinal curvature, and each has a central opening defined by opposed integral spring fingers 116 which extend inwardly from opposite ends of each clip so that when a clip is forced down onto a globe ring projection 114, the ends of fingers 116 will frictionally engage opposite sides of the globe ring projection 114 with the result that the fingers 116 are deflected and stressed to the position shown in FIG. 5. The free ends of the fingers 116 will tend to dig into its globe ring projection 114, when it is attempted to raise the globe ring clip 112 from the globe ring projection 114, and thus prevent removal. The opposite ends of the globe ring clips 112, then, resiliently engage the reflector flange 78 and the refractor ring 20, respectively, to provide a secure resilient holding means for retaining the refractor 22 in place within the refractor ring 20, while allowing the refractor 22 to move upwardly under externally applied stress for a short distance due to the resilient nature of the clips 112.

Figure 13:
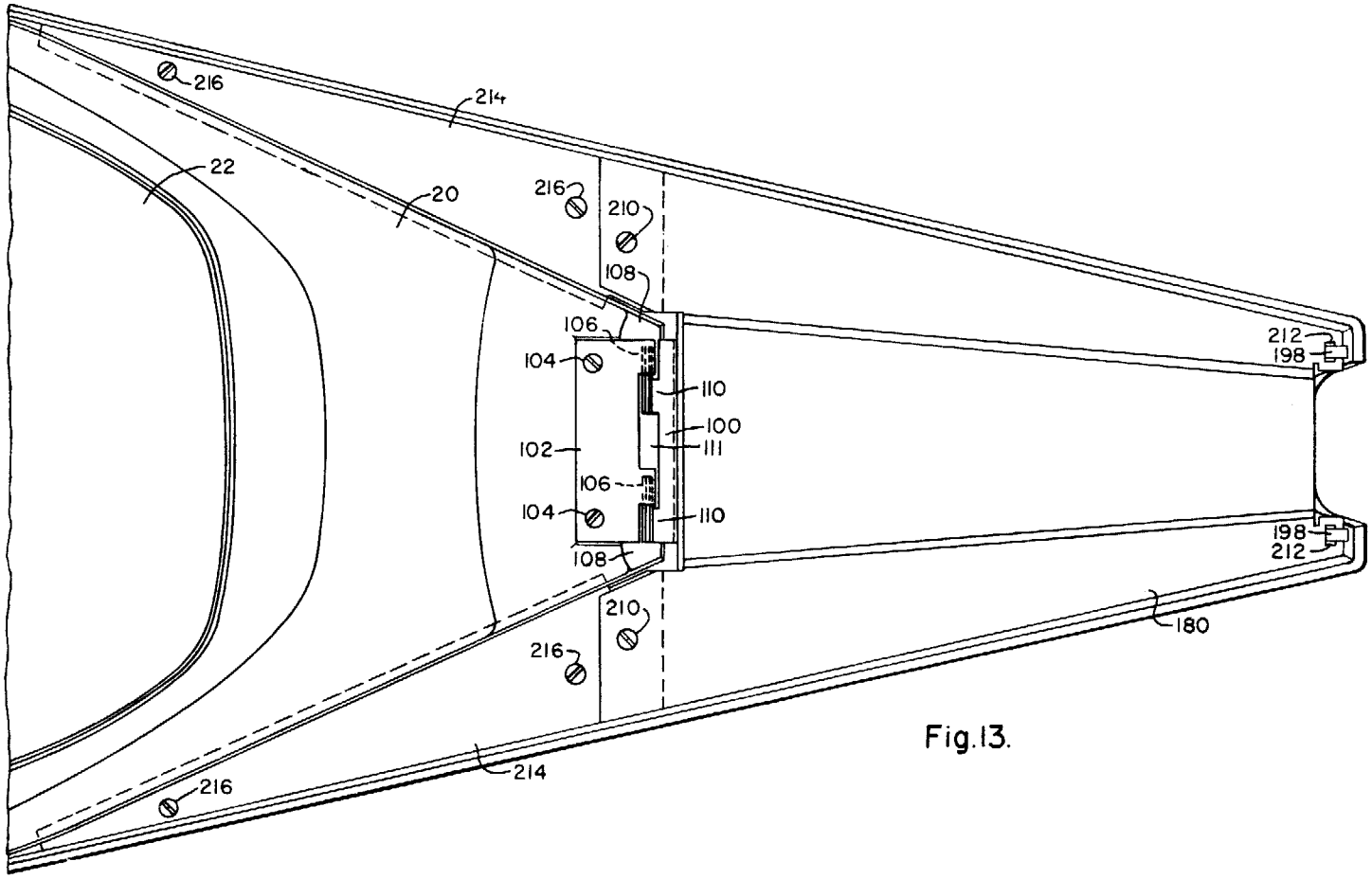
FIG. 13 is an enlarged bottom plan view of a portion of the luminaire shown in FIG. 2 with the cover plate and closure assembly in their closed operative position.

As shown in FIGS. 1, 15, 16 and 17 there is mounted to the underside of the housing 10, by means of rear flange 200 thereof, an L-shaped hinge hanger 100. The hinge hanger 100 is secured to the rear flange 200 by means of nut, bolt and lock washer assemblies 38 passing through the hinge hanger apertures 37. The hinge hanger 100 extends downwardly and inwardly of the housing slipfitter portion 32 and has at its free end two spaced semicircular hinge hanger pivot pins 110 integrally supported by relatively narrow supports 105 and 107. The hinge hanger pivot pins 110 are not located symmetrically relative to the hinge hanger 100 but, as shown in FIG. 14, are somewhat offset so that one hinge hanger pivot pin 110 has its support 105 located at one lateral side of the hinge hanger 100, with the support 107 of the other hinge hanger pivot pin 110 spaced inwardly of the other side of hanger 100 a sufficient distance to accommodate the lateral width of a hinge pivot ring 106. FIGS. 1, 14, 15, 16 and 17 show that the hinge pivot rings 106 are formed integral with a refractor ring hinge plate 102. The refractor ring hinge plate 102 is located on the closure portion 21, and is mounted thereto by the rivets 104 passing through aperture 103. The refractor ring hinge plate 102 has two outwardly extending projections with the other ends reversibly curved to provide the tubular hinges 106 from receiving the pivot pins 110, respectively. As shown in FIG. 13 of the drawings, the hinge pivot rings 106 overlap with the hinge pivot pins 110 thereby forming a hinge hanger aperture 111 as the only opening in the bottom surface of the luminaire.

The aperture 111 is relatively small thereby restricting entrance of foreign matter into the interior of the luminaire.

As shown in FIGS. 1, 15, 16 and 17, the closure portion 21 adjacent its rearmost portion has an upwardly extending integral end wall 109. At each side of the wall 109 closely adjacent to but somewhat above the bottom surface 11 of the housing 10 are horizontally extending hinge stops 108 formed integrally in this example with the end wall 109. These hinge stops 108 will rotate with the closure portion 21 when it is rotated to its open position. Because outer ends 113 of the hinge stops 108 are located above the base surface 11 of the housing 10, the closure portion 21 cannot be removed from the hinge hanger 100 by sliding it to the side so as to disengage the hinge pivot ring 106 from the hinge hanger pins 110. It becomes necessary, therefore, to rotate the closure portion 21 about its pivot axis defined by the hinge pivot rings 106, to and beyond its normal free-hanging open position before the hinge stops 108 are moved to a point where the outer ends 113 will be located beneath the base surface 11 of the housing 10.

Figure 15:
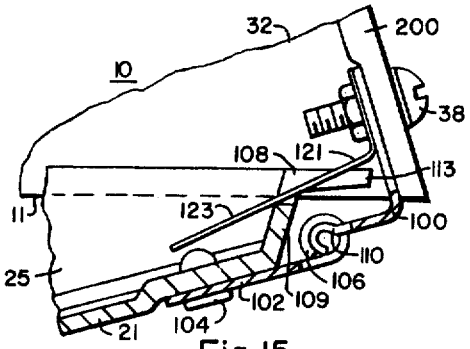
FIG. 15 is an enlarged sectional view of a part of the luminaire showing the hinge mechanism in the closed position for the refractor closure assembly of the luminaire shown in FIG. 1.
Figure 16:
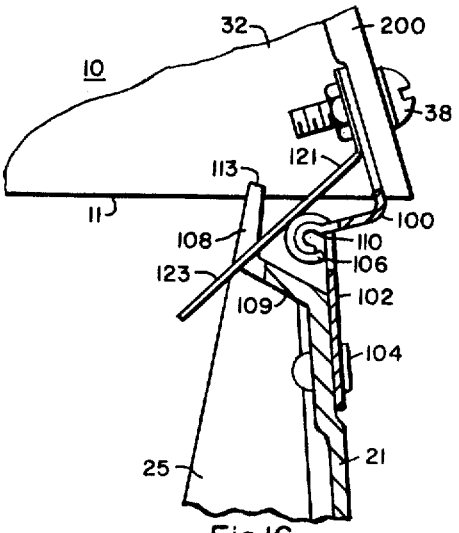
FIG. 16 is an enlarged sectional view of a part of the luminaire showing the hinge mechanism in the open position for the refractor closure assembly of the luminaire shown in FIG. 1.
Figure 17:
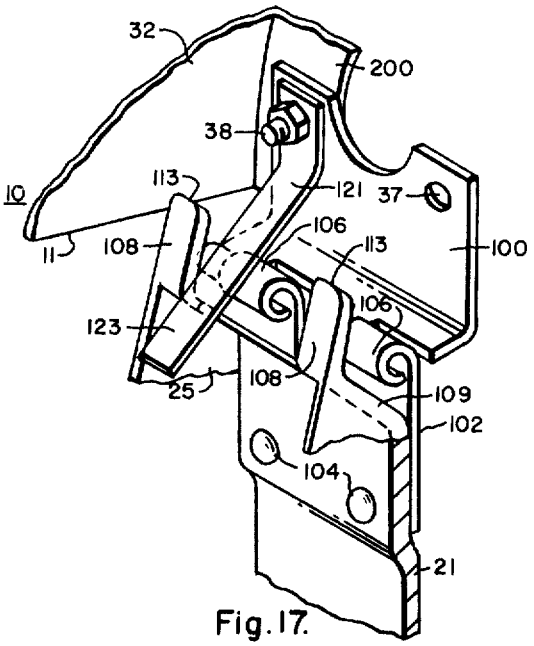
FIG. 17 is an enlarged sectional perspective view of a part of the luminaire showing the hinge mechanism in the open position for the refractor closure assembly of the luminaire shown in FIGS. 1 and 16.

To illustrate better the cooperation of the hinge stops 108 with the base surface 11 of the housing 10, particular reference is made to FIGS. 15, 16 and 17. In FIG. 15, the closure portion 21 is in its closed operative position, with the hinge stop 108 being located above the bottom periphery 11 of the housing 10. An arcuately bent, resilient leaf spring 121 as previously described, is mounted to the hinge hanger 100 by means of the nut, bolt and lock washer assemblies 38, and extends downwardly so that the outer portion 123 of the leaf spring 121 rests on the upper surface of the upwardly extending wall 109. The refractor ring hinge 102 cannot be disengaged from the hinge hanger 100 by sliding the closure portion 21 to one side so as to disengage the hinge pivot rings 106 from the hinge hanger pins 110, as upwardly extending side walls 25 of the closure portion 21 and the hinge stop 108 will abut against the slipfitter side walls 29.

As shown in FIG. 16, the closure portion 21 is in its normal free-hanging open position and is supported to the housing 10 by the hinge hanger 100 rotatably engaging the refractor ring hinge 102. When the closure portion 21 is in the position shown in FIG. 16, the outer portion 123 of the leaf spring 121 will engage the outer surface of the hinge pivot ring 106. It is to be noted, as shown in FIG. 17, that the leaf spring 121 is mounted to extend downwardly of the housing 10 and closely adjacent to the hinge stop 108. As the closure portion 21 is rotated about its pivotal axis as defined by the hinge pivot ring 106, the outer portion 123 of the leaf spring 121 will frictionally engage the outer surface of the hinge pivot ring 106. As the closure assembly 21 is rotated beyond its normal free-hanging position, the outermost portion

113 of the hinge stop 108 will be located below the base surface 11 of the housing 10.

In this position, the closure portion 21 may be slidably removed by exerting a transverse force on the closure portion 21 to the right, as shown in FIG. 17. However, the hinge stop 108 will engage the outer portion 123 of the leaf spring 121 thereby to prevent removal of the closure portion 21 unless the leaf spring 121 can be upwardly biased a sufficient distance to allow the outermost portion 113 of the hinge stop 108 to pass beneath the upwardly biased spring 121. The leaf spring 121, thereby provides an added means for preventing accidental removal of the closure portion 21 from the luminaire.

To remove the closure portion 21, it is merely necessary to rotate the closure portion beyond its normal free-hanging position and to bias upwardly the leaf spring 121 so that the refractor ring hinge 102 can be removed sideways to disengage the hinge pivot rings 106 from the hinge hangers pins 110. The hinge stop 108 is designed so that it is of sufficient length to engage the slipfitter side walls 29 when the closure portions is in its free-hanging open position.

The housing slipfitter portion 32 is a relatively elongated, tapered, inverted U-shaped portion of the housing 10 extending downwardly from the reflector 14 and formed integrally with the housing 10. Located at each side and adjacent to the outermost end of the housing slipfitter portion 32 are pipe support clamp bosses 42 formed integrally therewith and having tapped holes 43 extending upwardly from the bottom of the bosses 42. Located intermediate of the reflector 14 and the housing rear flange 200, and extending integrally and downwardly from the top wall of the housing slipfitter are two laterally-spaced arms 56. The arms 56 are located intermediate of the side walls of the housing slipfitter portion 32 and the longitudinal center line of the luminaire housing slipfitter portion 32, respectively. The arms 56 each have a slot (not shown) extending longitudinally thereof. Flanges 52 and 54 extend the length of the arms 56 at each side and project inwardly. Flanges 52 and 54 form a slide with the aforementioned slot therein, between which is slidably mounted a pipe stop 59. The pipe stop 59 is ring-shaped having a surface contour shaped like a circular truncated cone 60 tapered towards the reflector 14 with its outer end having a horizontal ring-shaped portion 58. At the innermost portion of the pipe stop 59, an inwardly extending integral flange 62 is located. The internal configuration of the pipe stop 59 consists of two hollow cylindrical cavities located concentrically therein, to accommodate the two standard diameter pipe supports, of which inner cavity 45 accommodates the pipe support 40. However, outer cavity 47 has a substantially larger diameter than the inner cavity 45 so as to accommodate the larger diameter pipe support 41. Each of the hollow cylindrical cavities 45 and 47 have threaded apertures 49 and 51, respectively, through which a pipe stop bolt 64 may be threadedly engaged to secure the pipe stop 59 to whichever pipe support, 40 or 41, that is used.

The pipe stop bolt 64 is shown in FIG. 1 as threadedly engaging the aperture 51 located in the outer cavity 47. Located adjacent each side of the circular pipe stop 59 is a threaded pipe stop aperture 50. A bolt and lock washer (not shown) extends through the slot of each pipe stop boss 56 and engages the pipe stop apertures 50. The bolt and lock washers when loosened permit vertical adjustment of the pipe stop 59 relative to the slots in the pipe stop bosses 56, and may be tightened to secure the pipe stop 59 at a desired adjusted position. A pipe stop bolt 64 extends through a threaded hole in the bottom of the pipe stop portion 58 and may be tightened to engage pipe support 40 extending inwardly of the luminaire housing slipfitter portion 32 and engaging the flange 62 of the pipe stop 59.

Extending between the oppositely disposed pipe support clamp bosses 42 is a pipe support clamp 44 which is adjustably mounted by means of bolt and lock washer assemblies 46. At each end of the pipe support clamp 44, the bolt and lock washer assemblies 46 threadedly engage the tapped holes 43 in the bosses 42. As shown in FIG. 1, a small pipe support 40 is inserted into the luminaire so as to engage the pipe stop 59. By adjustment of the bolts inserted in the pipe stop holes 50, the vertical alignment of the luminaire may be determined after which the pipe stop bolt 64 is tightened and the two bolt and lock washer assemblies 46 are also tightened to engage the pipe support clamp 44 to the bottom surface of the pipe support 40, thereby securely mounting the housing 10 to the pipe support 40.

Figure 3:
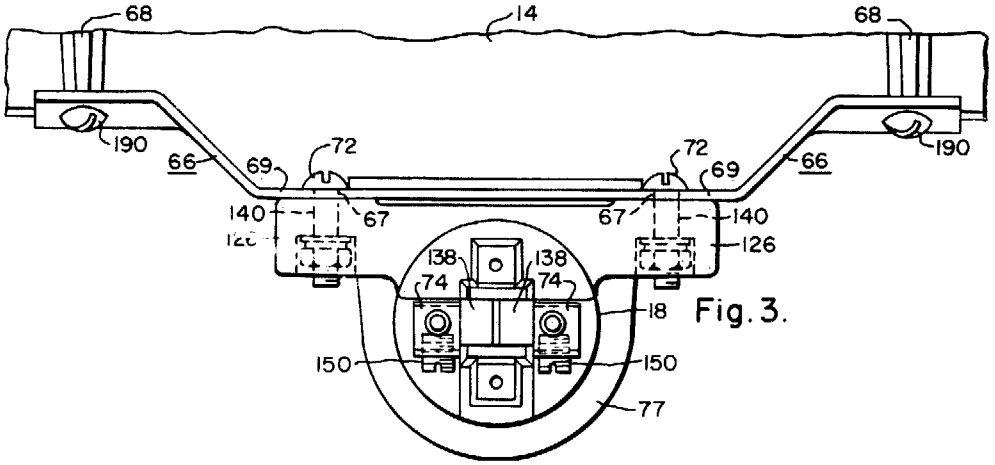
FIG. 3 is an end view of the lamp socket and its mounting with a part of the reflector as viewed from the terminal end of the socket.
Figure 6:
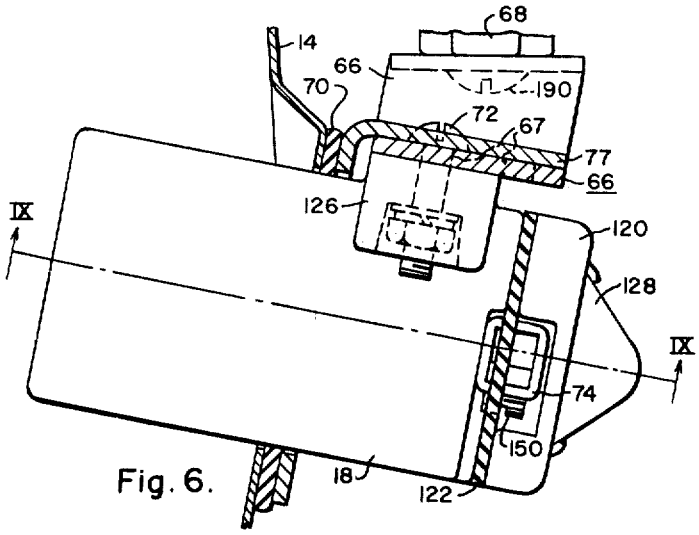
FIG. 6 is an enlarged side elevation view of a series lamp socket used in the luminaire of FIG. 2 and associated parts, with certain of the parts shown in section.

Located inwardly of the pipe stop 59 and closely adjacent to the reflector 14 on the side walls of the housing 10 are integrally formed socket mounting bosses 68. Each socket mounting boss 68 has a suitable tapped hole to threadedly engage a socket mounting stray screw 190. Extending between the opposed socket mounting bosses 68, as shown in FIG. 3, is a socket mounting strap 66. The socket mounting strap 66 has a slight twist to its configuration immediately adjacent to the socket mounting bosses 68. The socket mounting strap 66 has a generally U-shaped configuration intermediate of the opposed socket mounting bosses 68 and has a flat horizontal bight portion 69. As shown in FIG. 6, two pairs of apertures 67 are located near the extremities of the bight portion 69. A socket base 126 of insulating material, such as porcelain, is mounted to the bight portion 69 by socket mounting nut and bolt assemblies 72 extending through apertures 67 and base apertures 140. Molded integrally with the porcelain base 126 is a lamp socket 18. By having two pairs of apertures 67 located in the bight portion 69 of the socket mounting strap 66, the socket 18 can be mounted in two positions relative to the center of the reflector 14. The light source (not shown) can be mounted in the socket 18 with its light center (not shown) located in a forward or rearward position to provide differing light distributions. By having an adjustable mounting of the light socket 18, greater flexibility can be given to the light distribution desired.

Figure 9:
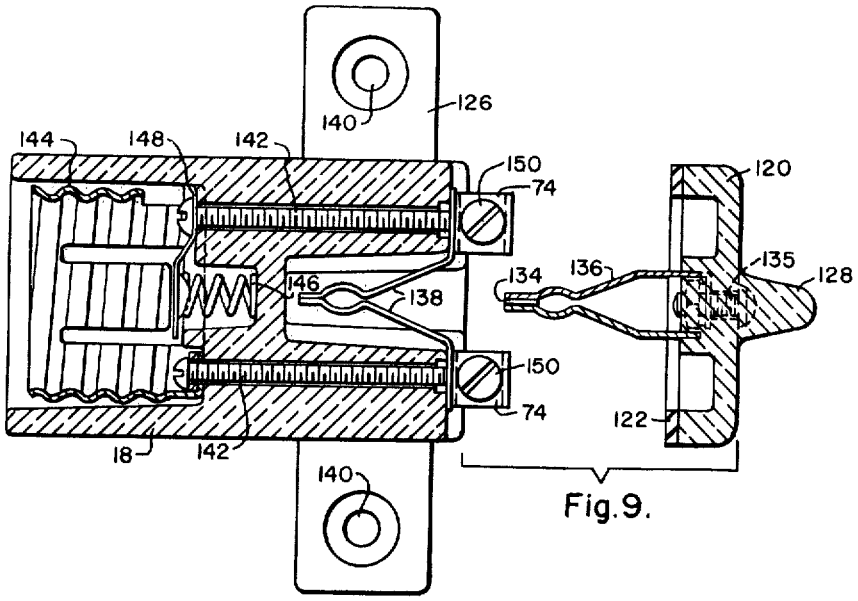
FIG. 9 is a longitudinal cross-sectional view of the lamp socket shown in FIG. 6 and taken on the line IX—IX thereof, with the film holder partly removed from its receptacle.

FIGS. 6 and 9 illustrate lamp socket 18 incorporating a film cutout in which film cutout 134 is of a wafer type insulating material that breaks down when a certain minimum value of voltage is applied across contact prongs 138 of the film receptacle so that an electrical current can flow across the cutout 134, thereby short circuiting lamp socket shell 144 and central contact 148. In this manner a fault in the socket 18 causes the latter to be taken out of the series circuit. The particular luminaire illustrated in FIG. 1 has a lamp socket 18 that does not incorporate a film cutout; therefore the electrical connections are made directly to socket terminals 74 and are securely held in place by terminal screws 150. As shown in FIGS. 6 and 9, however, a film cutout may be incorporated in the socket structure. FIG. 6 shows a film cutout cap 120 fabricated from porcelain and having a cap handle 128 inserted and positioned in the outer end of the socket 18. A cap bumper ring 122 made of a compressible material, such as felt or rubber, separates the porcelain socket 18 and the porcelain cap 120. Electrical connections may be made to the lamp socket terminals 74 located on each side of the lamp socket 18.

FIG. 9 shows the lamp socket 18 incorporating a film cutout in which the lamp socket shell 144 is mounted within a recess in the inner end of the lamp socket 18. The socket shell 144 is connected to one of the terminals 74 by a bolt 142. The remaining terminal 74 is connected to the socket central contact 148 by the other bolt 142, and the central contact 148 is held in operative position by a socket spring 146. The film receptacle contact prongs 138 are mounted on the elongated socket bolts 142 and extend into a recess in the outer end of the lamp socket body 18 and are of a resilient conducting material and biased to engage each other at their free ends. The film receptacle cap 120 can also be made of porcelain, and mounts film holder prongs 136 by means of spaced nut and bolt assemblies 135, respectively, passing through the film receptacle cap 120. A film cutout 134 separates the free ends of the film holder prongs. The film holder and the film receptacle operate in a manner as described in the previously known prior art. It is to be noted, that the film holder and the film receptacle are readily accessible when the closure assembly is in its open position.

Figure 8:
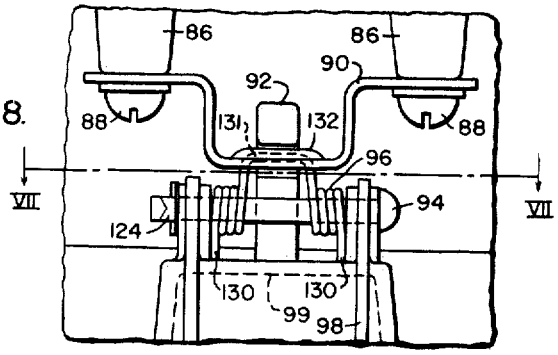
FIG. 8 is a fragmentary view illustrating the latch mechanism shown in FIG. 7, and taken substantially on the line VIII—VIII of FIG. 7.

Mounted within the housing 10, as shown in FIG. 1, is the generally inverted dish-shaped ovate reflector 14, previously mentioned. The ovate reflector 14 has a flattened end adjacent the housing slipfitter with an aperture 17 located centrally therein. About the open periphery of the reflector 14 is an outwardly extending reflector flange 80, which has a felt gasket 76 securely mounted on the lower surface thereof. To form the reflector flange 80, the material of the reflector 14 is bent back on itself at its lower portion as shown at 81, thereby to produce a folded lower edge 83, and the edge portion of the upwardly bent portion 81 is then bent outwardly to form the reflector flange 80. Approximately diametrically opposite to the reflector aperture 17, and mounted to the upper surface of the outwardly extending reflector flange 80 by means of a rivet 84, is an upwardly extending reflector latch 82. The reflector latch 82 is an upwardly extending, flat, spring steel member, arcuately bent adjacent its outer end to form a detent 85. Formed integrally with the housing 10, and extending downwardly from the inner upper surface of the housing 10 are two latch bosses 86, as shown in FIG. 8. A latch stop or catch 90, of generally U-shaped configuration, with the ends of its legs extending outwardly, is mounted between the two latch bosses 86 and secured thereto by two bolts 88. The detent 85 of the reflector latch 82 engages the bight portion of the latch stop or catch 90 to secure the reflector 14 in position.

A flat right angle gasket plate 77 (FIGS. 1 and 6) having an aperture in its downwardly extending leg to receive the lamp socket 18 is mounted, by any convenient and known method such as spot welding, to the bight portion 69 of the socket mounting strap 66. About the aperture in the gasket plate 77, a circular gasket 70 of a compressible material, such as felt or rubber, is mounted. The reflector 14 having the aperture 17 is inserted into the housing 10 in such a manner that the reflector aperture 17 telescopes over the lamp socket 18, with the periphery adjacent the reflector aperture 17 abutting against the felt gasket 70. Then the opposite end of the reflector 14 is raised in order to depress the resilient reflector latch 82 until its detent engages the latch stop 90. In this manner, the reflector 14 has at least a two-point suspension, namely, at the latch 82 and the lamp socket 18, with the uppermost ovate portion of the reflector 14 being engageable with the longitudinal rib 13 and perhaps a part of at least one of the lateral ribs 15 located on the upper inner surface of the housing 10.

Figure 2:
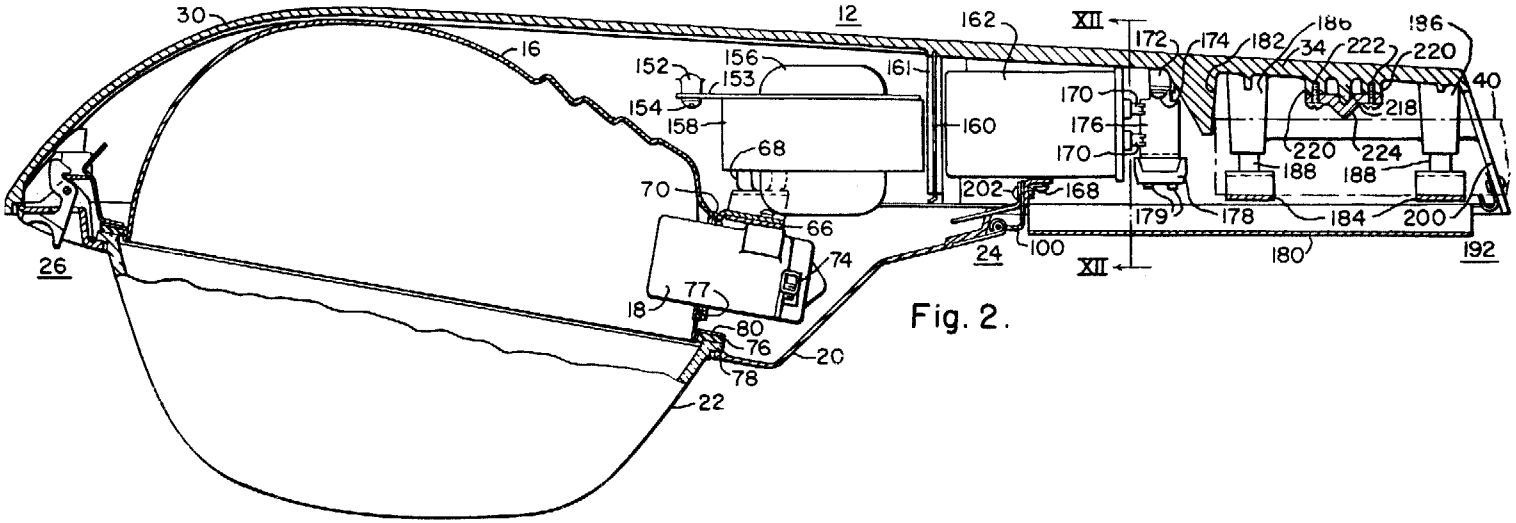
FIG. 2 is a side elevation view of a modified form of luminaire having ballasts and transformers located therein, with certain of the parts shown in section.

The suspension of the reflector 14 on the lamp socket 18 and the latch stop 90 is such that a small amount of tilting of the reflector 14 can possibly occur, so that the groove 23 in the reflector may not be properly fitted with the longitudinal rib 13. Upon closing the refractor ring 20, the refractor flange 78 will tend to engage the gasket 76 and the reflector flange 80, with constant uniform pressure and the reflector 14 will automatically be tilted to its proper operative position so that the groove 23 will be properly fitted with the longitudinal rib 13. By having the longitudinal rib 13 and the lateral ribs 15 in the housing 10, the reflector 14 engages the inner portion of the housing 10. It is to be noted that the reflector 16 as depicted in FIG. 2 can be designed to have a smooth contour for a particular light distribution to thereby eliminate the longitudinal groove 23. Even without the longitudinal groove 23 the upper surface of reflector 14 will engage the ribs 13 and 15 of the housing 10 with a minimum of surface contact and of resultant friction between the aforesaid ribs and the reflector 14, during any tilting thereof as described above.

Figure 7:
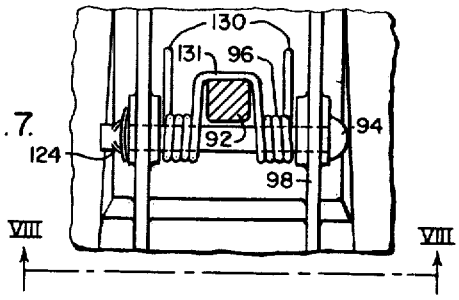
FIG. 7 is a fragmentary top plan view illustrating the latch mechanism for the luminaires shown in FIGS. 1 and 2 and taken substantially on the line VII—VII of FIG. 8 with certain of the parts shown in section.

As shown in FIG. 1 of the drawings, opposite the lamp socket 18 and closely adjacent to the reflector latch 82 there is located a latch assembly 26. As shown in FIGS. 1, 7 and 8, two upwardly extending bearings 98 are formed integrally with the refractor ring 20 and have a latch pin 94 extending therebetween. A latch 92 is rotatably mounted on the latch pin 94, and is biased in a clockwise direction as viewed in FIG. 1 by a coiled spring 96 as shown in FIGS. 7 and 8. The latch 92 has at its lower end a contoured latch handle 133 which in this example is cast of one piece aluminum, with the latch handle 133 extending at right angles and outwardly of the latch 92. The latch 92 extends through a slot 97 in a recessed portion 99 of the refractor ring 20, with the outer end of the contoured latch handle 133 abutting against the horizontal portion of the recessed portion 99 when the latch 92 is in its closed position.

As shown in FIGS. 7 and 8 of the drawings, the resiliently biased coiled spring 96 consists of two coiled sections wrapped around the latch pin 94 and connected by a bight portion 131 that abuts against the latch 92. To anchor the coiled spring 96, the ends 130 engage the horizontal portion of the recess 99. In its closed position, the latch 92 abuts against the latch stop 90 at the latch stop projection 132 thereof. The latch spring 96 is stressed to bias the latch 92 to the closed position, but as shown in FIG. 1, the latch is prevented from further rotation by the engagement of the latch handle 133 with the underside of the refractor ring 20. The latch 92 has a cam front surface 93 at the upper end so that even though the latch 92 is constantly biased to the closed position, when the refractor ring 20 is raised to its closed position, the cam surface 93, by engaging the latch stop projection 132 of the latch stop 90, will move the latch 92 so as to rotate it in a counterclockwise manner until the horizontal surface 95 of the latch 92 can engage the upper horizontal surface of the latch stop 90 whereupon the spring 96 moves the latch 92 to the closed position. As shown in FIGS. 7 and 8 of the drawings, the latch pivot pin is securely held in place by a push on nut 124.

Another embodiment of this invention is shown in FIG. 2 of the drawings. Identical reference numerals are used in this embodiment for the parts thereof which are identical to the embodiment of the invention shown in FIG. 1. As shown in FIG. 2, the housing 12 has a much longer slipfitter portion 34 extending outwardly from the housing 12, thereby providing more space for mounting associated electrical components. The reflector section 30 of the housing 12 incorporates a latch assembly 26 cooperating with a hinge assembly 24 to releasably support the refractor ring 20 having a refractor 22. The mounting of the lamp socket 18 is substantially the same as is used in the luminaire of FIG. 1 in which a socket mounting strap 66 extends between and is secured to integrally cast socket mounting bosses 68 located in the sidewalls of the housing 12. A gasket 70, made of any suitable material such as felt, separates the gasket plate 77 from the reflector 16. In the particular embodiment shown, the reflector 16 may have a different contour to its upper inner surface, but this goes to its optical characteristics and does not constitute a part of the invention.

Felt gasket 76 and a reflector flange 80, cooperate as previously described, with the refractor flange 78 when the refractor ring 20 is in its closed or operative position.

Mounted immediately adjacent to and above the lamp socket 18 is a transformer having a coil 156 and core 158. The transformer coil 156 and its core 158 are secured to an elongated trapezoidal flat mounting plate 153 by a nut and bolt assembly (not shown). The mounting plate 153 is secured to integrally cast housing transformer bosses 152 located on the upper inner surface of the housing 12 at each side and is secured thereto by the transformer bolt assemblies 154 threadedly engaging tapped holes (not shown) located within the housing transformer bosses 152.

To the rear and immediately adjacent to the transformer core and coil assembly, and on the inner periphery of the housing 12, there is integrally formed a slot 161 into which a flat, heat baffle plate 160 may be slidably mounted. The heat baffle plate 160 may be made of any suitable heat barrier material, for example, a heat reflecting material such as aluminum, and is securely held in place by any suitable method, such as by spot welding to the housing 12.

Figure 12:
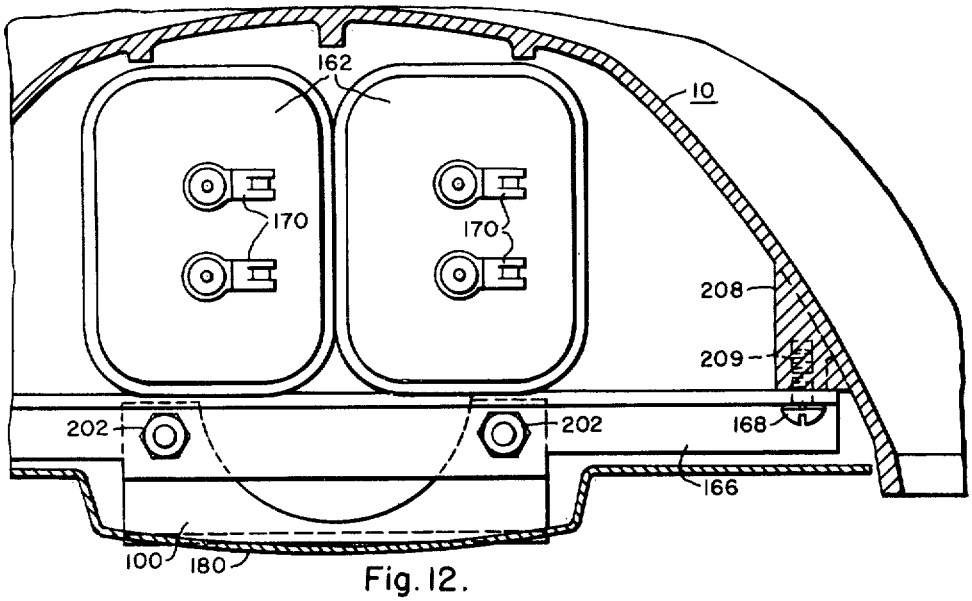
FIG. 12 is an enlarged transverse cross-sectional view of the luminaire shown in FIG. 2, and taken substantially on the line XII—XII of FIG. 2.

Since the particular embodiment shown in FIG. 2 requires a constant wattage or regulated output ballast and also a high power factor, high reactance type ballast, a certain amount of capacitance is required to give the desired power factor. It is to be noted that construction of this luminaire should not be limited to the use of a capacitive means as the capacitive means may be eliminated should no power factor correction be needed. As shown in FIGS. 2 and 12 of the drawings, capacitors 162 having capacitor terminals 170 facing outwardly of the reflector 16, are mounted immediately adjacent to the heat baffle plate 160 and are supported within the housing 12 by the hinge support strap 166. The hinge support strap 166 is of sufficient width to adequately support the capacitor 162 when they are in their mounted or operative position.

As shown in FIG. 12, when the hinge support strap 166 is drawn upwardly by tightening bolts 168, the capacitors 162 will engage the upper inner periphery of the elongated housing 12. Hinge support bosses 208 are formed integrally with the inner side wall of the housing 12 and have tapped holes 209 through which the bolts 168 will be threadedly engaged.

Figure 11:
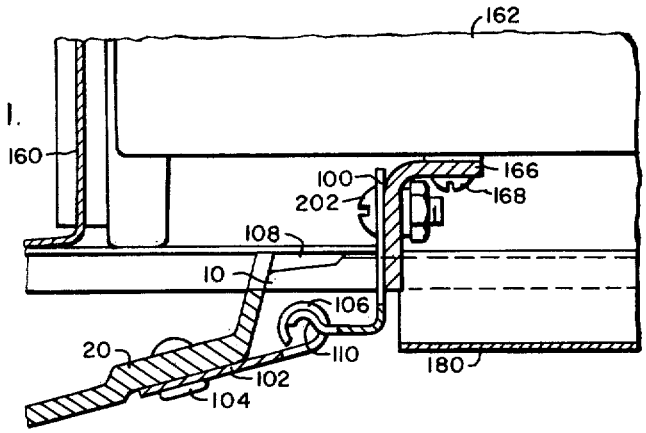
FIG. 11 is an enlarged sectional view of a part of the luminaire showing the hinge mechanism for the refractor closure assembly of the luminaire shown in FIG. 2.

As shown in FIGS. 2 and 12, there is integrally formed slightly below and to the rear of capacitor support bosses 206, two hinge support bosses 208, each having tapped holes 209. By means of hinge support bolt assemblies 168 engaging the threaded tapped holes 209, and L-shaped channel hinge support 166 is mounted within the underside of the housing. An L-shaped hinge hanger 100 having its base leg facing towards the reflector 16 is mounted to the hinge support 166 by means of nut and bolt assemblies 202. As shown in FIG. 11 of the drawings, the base leg of the hinge hanger 100 has hinge hanger rings 110, to which the refractor ring 20 is rotatable and detachably mounted in the manner previously described. It is readily apparent that the identical refractor ring 20 and its associated hinge assembly 24 as used in the prior embodiment of the invention may be used in the embodiment now being discussed.

As shown in FIG. 2, immediately adjacent to and rearwardly of the capacitors 162, there is located a terminal block 178, which is suspended from two bosses 172 formed integrally with the inner upper periphery of the housing 10 at each side by means of a hanger 176 mounted on the bosses 172 by bolt assemblies 174. The terminal block 178 is located in the lower half of the housing 12 with its terminals 179 facing downwardly so that it is readily accessible to the capacitor terminals 170 and other electrical components that need be wired.

Outwardly of the terminal block 178 a pipe stop 182, formed integrally with the housing 12 extends downwardly from the upper wall of the housing 12 and between the side walls of the housing. A pair of longitudinally spaced pipe clamp bosses 186 are located on each side of the elongated housing slipfitter portion 34 outwardly of the pipe stop 182 and extend downwardly and have a pipe clamp 184 extending between the oppositely disposed walls of the inverted housing slipfitter 34. The pipe clamps 184 are adjustably mounted to the housing by means of pipe clamp bolts 188 threadedly engaging the pipe clamp bosses 186. Intermediate of the pipe clamp bosses 186, and integral with the housing slipfitter 34, there is located a downwardly extending positioning boss or rocker fulcrum 218 extending across the bight portion of the inverted U-shaped housing slipfitter portion 34. If a large pipe support is used, the upper surface thereof will engage the positioning boss 218. Integrally formed with the housing slipfitter portion 34 located on each side of the positioning boss 218, are adapter bosses 220. A tapped hole in each adapter boss 220, threadedly receives adapter bolts 222 which secure an adapter 224 to the bight portion of the housing slipfitter portion 34. The adapter 224 is used to secure a smaller pipe support, such as pipe support 40 to the housing slipfitter portion 34, thereby supporting the luminaire. Positioning boss 218 or adapter 224 cooperating with pipe support 40 or 41, respectively, act as the upper support for mounting the luminaire. Bolts 188 may be adjusted in the threaded pipe clamp bosses 186 to obtain a longitudinal vertical rotation of the luminaire housing 10.

Figure 10:
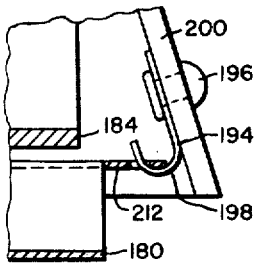
FIG. 10 is an enlarged sectional view of a part of the luminaire showing the hinge mechanism for the slipfitter cover shown in FIG. 2 and constructed in accordance with this invention.

As shown in FIGS. 2 and 10 of the drawings, there is located on each side of the housing rear flange wall 200, a cover hinge support 194 which has a hook-shaped portion 198 at its outer end. Each cover hinge support 194 is attached to the housing flange wall 200 by means of a rivet 196. A cover 180, which has a substantially central longitudinal channel as shown in FIG. 12, extends from a point adjacent the hinge assembly 24 to the outer end of the housing slipfitter portion 34. At its rearmost portion, and at each side, there are located two cover apertures 212, as shown in FIG. 13, which may be detachably mounted to the cover hinge support hooks 198. As shown in FIGS. 2, 10 and 13, the cover 180 may then be rotatably moved to the horizontal position and secured in its closed position by quick disconnect locking devices 210 which engage cover plate 214.

Since this embodiment of the invention incorporates the use of the refractor ring 20 as previously discussed in the prior embodiment, a portion of the bottom surface of the luminaire would be exposed; but, this portion is closed by two additional cover plates 214 located at opposite sides of the inner end of the refractor ring 20 and removably mounted to the housing 12 by cover plate screws 216. It is thus apparent, that the refractor ring may be rotated to an open position having its hinge assembly midway of the housing slipfitter portion 34. The cover 180 may be rotated about the cover hinge 192 to thus expose, in conjunction with the open refractor ring, all of the bottom surface of the housing slipfitter portion 34. If the transformer core or the capacitors 162 need be removed and more area, therefore, is required, the side cover plates 214 can be readily removed.

As previously pointed out, it is desired that this invention be not limited to the particular embodiments of luminaires specifically described herein, as it will be readily apparent to persons skilled in the art that various changes and modifications may be made in these particular constructions without departing from the broad spirit and scope of this invention. Thus, the lighting fixture may have various forms of housing or support, which can be used with or without a refractor, and various other components interchangeably made. These are illustrative, but not limiting, as to other forms which this invention might take and of various other ways in which the invention could be used. Accordingly, it is desired that the invention be given a broad scope interpreted broadly and that it be limited only in accordance with the prior art.

We claim as our invention:

1. A luminaire comprising a relatively shallow inverted dished housing with a bottom opening, means adjacent one end of said housing for supporting the housing, an inverted dished reflector having a bottom peripheral opening, means for loosely and removably mounting said reflector within said housing, a closure assembly hingedly secured to said housing, a latch means located on said closure assembly opposite said hinge mounting, an aperture in said closure assembly substantially of the same size as the bottom opening of said reflector, a refractor having an outturned flange lying over said aperture, means for securing said refractor flange to said closure assembly, said refractor flange engaging the bottom peripheral opening of said reflector when said closure assembly is in its latched closed position, thereby to tilt adjustably said reflector about its longitudinal axis in order to position said reflector in its operative position.

2. A luminaire comprising a relatively shallow inverted dished housing with a bottom opening, means adjacent one end of said housing for supporting the housing with its bottom opening substantially horizontal, lampholding means mounted in said housing for supporting a light source, an inverted dished reflector having a bottom opening mounted substantially within said housing, an aperture in said reflector adjacent said supporting means and of a size to accommodate said lampholding means, said lampholding means being one support for said reflector in its operative position, a resilient spring latch secured to the outer surface of said reflector opposite said aperture in said reflector, a catch mounted within said housing engaged by said resilient latch, the upper wall of said reflector frictionally engaging the inner top wall of said housing, and said aperture, said resilient latch, and said upper wall of said reflector being a three-point support for said reflector in said housing.

3. A luminaire comprising an inverted dished housing, means at one end of said housing for supporting the housing, an inverted dished reflector having a bottom opening, said reflector being mounted at least partially within said housing, a closure assembly for the bottom opening of said closure, hinge means on said housing and closure assembly, said hinge means disposed for separation by movement transversely of said housing, projecting means on said closure assembly positioned to engage an inner portion of said housing to prevent separation of said hinge means except at a positon beyond free-hanging open position of said closure assembly, resilient means on said housing engaging said projecting means when said closure assembly is at a position beyond the free-hanging open position, said closure assembly being removable from said housing when said resilient means is biased so as to disengage said projecting means.

4. A luminaire comprising an inverted dished housing having a bottom opening, means adjacent one end of said housing for supporting the housing with its bottom opening generally horizontal, an inverted dished reflector mounted substantially within said housing and having sides which form a bottom opening angularly displaced relative to the bottom opening of said housing, a peripheral flange around the reflector opening, a gasket on said reflector flange, an aperture in said reflector, lampholding means mounted in said housing and extending through said aperture for supporting a light source and supporting one end of said reflector, a gasket mounted on a plate adjacent said lampholding means so as to cover the portion of said aperture not occupied by said lampholding means, a latch stop secured to one of said housing and said reflector generally opposite said lampholding means, resilient means on the other of said housing and said reflector biasingly engaging said latch stop, a closure assembly for the bottom opening of said housing hingedly secured to the underside of said housing and presenting an opening the periphery of which is angularly displaced relative to the bottom opening of said housing so as to be adapted to align with the reflector opening, a refractor mounted on said closure assembly by means of an outturned flange on said refractor overlying the edges of an aperture in said closure assembly and engaging the reflector flange when the closure assembly is in its latched closed position so that it seals the bottom opening of said reflector and provides, in combination with the gasket on the plate, for sealing of the reflector aperture when the reflector aperture is biased towards said lampholding means by said resilient means so as to present a tilted sealed optical system in a generally horizontally disposed housing.

5. A luminaire comprising an inverted dished housing having a bottom opening, means adjacent one end of said housing for supporting the housing with its bottom opening substantially horizontal, an inverted dished reflector having a bottom opening and being mounted at least partially within said housing, the bottom opening of said reflector being disposed at an angle with respect to the bottom opening of said housing, an aperture in said reflector, a mounting strap secured to the inside of said housing, a gasket plate secured to said strap, an aperture in said gasket plate substantially in registration with said reflector aperture, a gasket on the side of said gasket plate adjacent said reflector, the gasket surrounding the registered apertures and placed so as to generally lie between said apertures, lampholding means extending through said registered apertures for supporting a light source and for supporting one end of said reflector and thus sealing the reflector aperture, a catch secured to one of said housing and said reflector generally opposite said lampholding means, resilient means on the other of said housing and said reflector biasingly engaging said catch to support said reflector and bias said reflector towards said gasket plate, a gasketed peripheral flange around said bottom opening of said reflector, a closure assembly hingedly mounted to said housing, a releasable latch means for securing said closure assembly to said housing in a closed position, an outer rim of said closure assembly mating with the open bottom of said housing when in a closed position, and a refractor having a peripheral flange mounted in said closure assembly with said refractor flange engaging said gasketed reflector flange when the closure assembly is in a closed position so as to present a tilted sealed optical system in a substantially horizontally disposed housing.

6. A luminaire comprising a relatively shallow inverted dished housing with a bottom opening, means adjacent one end of said housing for supporting the housing with its bottom opening substantially horizontal, lampholding means mounted in said housing for supporting a light source, an inverted dished reflector having a bottom opening and mounted at least partially within said housing, an aperture in said reflector adjacent said supporting means and of a size to accommodate said lampholding means, said lampholding means being one support for said reflector, a resilient spring latch mounted on one of said housing and said reflector generally opposite said aperture in said reflector, a catch mounted on the other of said housing and said reflector and engaged by said resilient latch, said resilient latch providing another support for said reflector so that said lampholding means and said resilient latch form at least a two-point support for loosely mounting said reflector in said housing.

7. A luminaire comprising an inverted dished housing having a peripheral bottom opening, an inverted dished reflector having a peripheral bottom opening, said reflector mounted at least partially within said housing, the periphery of the bottom opening of said reflector disposed at an angle with and located beneath the periphery of the bottom opening of said housing, an outwardly extending flange about the periphery of the bottom opening of said reflector, lampholding means mounted in said housing and extending toward said reflector for supporting a light source therein, a closure assembly hingedly secured to the underside of said housing, said closure assembly including a refractor, an outwardly extending flange on said refractor engaging the flange on said reflector in the closed operative position of said closure assembly, said reflector being aligned relative to said refractor and being covered thereby in said operative position.

8. A luminaire comprising a relatively shallow housing with opposite ends and a bottom opening periphery, means adjacent one end of said housing for supporting the housing, a relatively deep inverted dished reflector mounted at a position spaced from both ends of said housing, said reflector having a bottom opening periphery extending below said housing and disposed in a plane angularly displaced with respect to a plane passing through the bottom opening periphery of said housing, an aperture in said reflector adjacent said supporting means, lampholding means secured to said housing and extending towards said aperture for supporting a light source in said reflector, said lampholding means being at least partially located beneath the bottom opening periphery of said housing, and a closure assembly hingedly mounted adjacent said one housing end, portions of said closure assembly enclosing the bottom opening peripheries of said housing and said reflector and containing said lampholding means when in its closed operative position.

9. A luminaire comprising an inverted dished housing with a bottom opening, means adjacent one end of said housing for supporting the housing with the periphery of its bottom opening in one plane, an inverted dished reflector having a bottom opening and mounted at least partially in said housing, the periphery of the bottom opening of said reflector lying in another plane angularly displaced with respect to said one plane, said reflector periphery being located at least partially downwardly of said one plane, lampholding means mounted at least partially within said reflector and sealed therewith, a closure assembly hingedly secured to the underside of said housing, a refractor having a top opening and secured with said closure assembly, the periphery of the top opening of said refractor lying generally in a plane parallel with said other plane and sealingly engaged with the periphery of the bottom opening of said reflector when the closure assembly is in its operative closed position.

10. A luminaire comprising a relatively shallow inverted dished housing with a bottom opening, lampholding means secured to said housing for supporting a light source, an inverted dished reflector having a bottom opening and mounted at least partially within said housing, said reflector including an aperture fitted over a portion of said lampholding means and being at least partially rotatable thereabout, a resilient member secured to one of said reflector and said housing at a position generally opposite said aperture in said reflector, catch means secured to the other of said reflector and said housing and releasably holding said resilient member, a light transmitting member, means hingedly securing said light transmitting member to the underside of said housing, said light transmitting member having a top opening the periphery of which is engageable with the periphery of the reflector bottom opening in the closed operative position of said light transmitting member, said lampholding means and said resilient member rendering said reflector at least partially tiltable in a universal manner for optical alignment when engaged by said light transmitting member.

11. A luminaire comprising an inverted dished housing, means adjacent one end of said housing for supporting the housing, an inverted dished reflector mounted substantially within said housing, an aperture in said reflector, lampholding means mounted in said housing and partially extending through said aperture for supporting a light source and supporting one end of said reflector, a catch mounted in said housing generally opposite said lampholding means, resilient means on said reflector engaging said catch, said lampholding means and said catch providing at least a two-point support for said reflector, a closure assembly for the open bottom of said housing and being hingedly secured thereto, releasable latch means on said closure assembly for engaging said catch.

12. A luminaire comprising a relatively shallow inverted dished housing with opposite ends and a bottom opening, a relatively deep inverted dished reflector having a bottom opening and mounted at a position spaced from both ends of the housing, support means adjacent one end of said housing for mounting the housing with its bottom opening substantially horizontal, said reflector having its bottom opening located at least partially beneath the bottom opening of said shallow housing and angularly displaced relative to the bottom opening of said housing, lampholding means secured to said housing and extending towards said reflector for supporting a light source therein, a closure assembly hingedly mounted to said housing adjacent said one end, and an angularly displaced refractor mounted in said closure assembly and mating with said angularly displaced reflector in the closed operative position of said closure assembly.

13. A luminaire comprising an inverted dished housing, means adjacent one end of said housing for supporting the housing, an inverted dished reflector mounted substantially within said housing, an aperture in said reflector, a socket mounting strap secured to the inner portion of said housing, a plurality of rows of cooperating aperture means associated with said strap, a socket having a light source holding portion and a base, said base being provided with apertures which register with any cooperating pair of said aperture means, means for securing said base to said aperture means in any one of a plurality of positions so as to make provision for adjusting the position of said light source, said light source holding portion extending through said reflector aperture in any adjusted position of said socket and supporting one end of said reflector, means mounted in said housing for supporting the other end of said reflector, an extension of said socket strap juxtaposed with said reflector and having an aperture in registration with said reflector aperture, sealing means located between the juxtaposed portions of said socket strap and said reflector around the periphery of said reflector aperture, said socket registering with said sealing means during adjusting movement thereof relative to said reflector so that said reflector aperture remains sealed at any adjusted position of said socket.

14. A luminaire comprising a relatively shallow inverted dished housing having an elongated configuration and a bottom opening periphery, a relatively deep inverted dished reflector having a bottom opening periphery and being mounted at a position spaced from both ends of said housing, lampholding means mounted within said housing and for supporting a light source in said reflector, the bottom opening periphery of said reflector being located at least partially beneath the bottom opening periphery of said housing and angularly displaced with respect thereto, an at least partially light-transmitting closure assembly hingedly secured to said housing, said closure assembly having an outer rim portion covering the bottom opening periphery of said housing, said closure assembly in addition having an inner ring-shaped portion angularly displaced with respect to said outer rim portion and engaging the bottom opening periphery of said reflector, said reflector and said closure assembly cooperating to form a weatherproof enclosure for the luminaire optical system.

15. A luminaire comprising a relatively shallow dished housing with a bottom opening, an elongated inverted generally U-shaped channel forming one end of said housing, an open bottomed dished reflector mounted partially within said housing and extending partially below the bottom opening periphery of said housing, said reflector being tilted with respect to said housing such that the bottom opening periphery of said reflector is angularly displaced with respect to the bottom opening periphery of said housing, lampholding means for supporting a light source in said reflector, said lamholding means secured to said housing and including socket and terminal portions located at least partially beneath the bottom opening periphery of said housing, ballast means at least parts of which are mounted closely adjacent to said reflector and directly over said lampholding means, and a closure assembly hingedly mounted to said channel, an inner portion of said closure assembly mating with the periphery of the reflector bottom opening and an outer portion of said closure assembly enclosing the bottom opening periphery of said housing and said channel and containing the parts of the reflector and lampholding means extending below the bottom open periphery of said housing.

16. A luminaire comprising an inverted dished housing having a bottom opening defined at least partially by a rim and disposed substantially in one plane, a slipfitter located adjacent one end of said housing, an inverted dished reflector located generally in said housing and having a bottom opening generally defined by a flange and disposed substantially in another plane angularly displaced from said one plane, lampholding means mounted within said housing for supporting a light source in said reflector, a closure assembly hingedly attached to said housing, a rim of said closure assembly juxtaposed with said bottom rim of said housing when in a closed position, and a refractor having an upper opening generally defined by a flange and mounted in said closure assembly with said refractor flange sealingly engaged with said reflector flange when the closure assembly is in said closed position.

17. A luminaire comprising a relatively shallow dished housing with a bottom opening, an inverted U-shaped channel formed at one end of said housing, said channel including means for supporting said housing with the periphery of its bottom opening in one plane, an inverted dished reflector having a bottom opening and mounted substantially within said housing, the periphery of the bottom opening of said reflector lying in another plane angularly disposed with respect to said one plane, lampholding means for supporting a light source in said reflector, said lampholding means located at least partially outwardly of said housing bottom opening and being secured to said housing, a closure assembly hingedly and removably secured to the underside of said housing, a refractor contained within said closure assembly and having a top opening the periphery of which is normally engaged with the periphery of the bottom opening of said reflector, electrical components mounted adjacent said reflector and in said inverted U-shaped channel, said closure assembly being rotatable to an open position thereof thereby exposing the electrical components mounted within said housing.

18. A luminaire comprising a relatively shallow dished housing with a bottom opening, an inverted U-shaped channel formed at one end of said housing, said channel including means for supporting said housing with the periphery of its bottom opening in one plane, an inverted dished reflector having a bottom opening and mounted substantially within said housing, the periphery of the bottom opening of said reflector lying in another plane angularly disposed with respect to said one plane, said reflector being tilted downwardly at its end adjacent said channel to provide added space in at least one of said housing and channel, lampholding means for supporting a light source in said reflector, said lampholding means located at least partially outwardly of said housing bottom opening and being secured to said housing, a closure assembly hingedly and removably secured to the underside of said housing, a refractor contained within said closure assembly and having a top opening the periphery of which is normally engaged with the periphery of the bottom opening of said reflector, electrical components mounted adjacent said reflector and at least partly in said space, said closure assembly being rotatable to an open position thereof thereby exposing the electrical components mounted within said housing.

19. A luminaire comprising an inverted dished housing having a bottom opening, means adjacent one end of said housing for supporting the housing with its bottom opening generally horizontal, a dished reflector having sides which form a bottom opening angularly displaced relative to the bottom opening of said housing, said reflector being mounted at least partially within said housing, lampholding means secured to said housing for supporting a light source in said reflector, a closure assembly for the bottom opening of said housing hingedly mounted to said luminaire adjacent said one end and presenting an opening angularly displaced from the housing opening so as to be adapted to align with the reflector opening, and a refractor mounted in said closure assembly opening to coextend with the bottom opening of said reflector when said closure assembly is in its operative closed position.

20. A luminaire comprising a relatively shallow inverted dished housing with a bottom opening, means for supporting said housing, an inverted dished reflector having a bottom opening and mounted substantially within said housing, an aperture in said reflector, lampholding means, supporting means in said housing on which said lampholding means is adjustably mounted at a position to register with said reflector aperture, said lampholding means extending through said aperture to support the adjacent end of said reflector, means for sealing said reflector aperture including a gasket located about said opening and in engagement with said reflector and lampholding means, said lampholder registering with said gasket during adjusting movement of said lampholder so that said reflector aperture remains sealed in any adjusted position of said lampholder, a catch secured to one of said housing and said reflector generally opposite said lampholding means, resilient means on the other of said housing and said reflector biasingly engaging said catch to support the end of said reflector opposite said aperture end, said resilient means biasing said reflector towards said supporting means so that said reflector aperture is sealed.

*21. A luminaire comprising a relatively shallow inverted dished housing with a bottom opening, means adjacent one end of said housing for supporting the housing, an inverted dished reflector having a bottom peripheral opening, an outwardly extending flange affixed to said reflector about the bottom peripheral opening thereof, means for loosely and removably mounting said reflector within said housing with all portions of the bottom peripheral opening of said reflector and said flange spaced from the bottom opening of said housing, a closure assembly hingedly secured to said housing, a latch means located on said closure assembly opposite said hinge mounting, an aperture in said closure assembly substantially of the same size as the bottom opening of said reflector, a refractor having an outturned flange lying over said aperture, means for securing said refractor flange to said closure assembly, said refractor flange engaging said outwardly extending flange about the bottom peripheral opening of said reflector when said closure assembly is in its latched closed position, thereby to tilt adjustably said reflector about its longitudinal axis in order to position said reflector in its operative position.*

*22. A luminaire comprising an inverted dished housing with a bottom opening, means adjacent one end of said housing for supporting the housing with the periphery of its bottom opening in one plane, an inverted dished reflector having a bottom opening and mounted at least partially in said housing, the periphery of the bottom opening of said reflector lying in another plane angularly displaced with respect to said one plane, said reflector periphery being located at least partially downwardly of said one plane, an outwardly extending flange affixed to said reflector about the periphery of the bottom opening thereof, an aperture in said reflector, lampholding means mounted at least partially within said reflector aperture and sealed therewith and adapted to support a light source within said reflector, a resilient spring latch mounted on one of said housing and said reflector generally opposite from said reflector aperture, a catch mounted on the other of said housing and said reflector and engaged by said resilient latch, said lampholding means and said catch providing at least a two-point support for said reflector with all portions of the bottom opening of said reflector and said flange spaced from the bottom opening of said housing, a closure assembly hingedly secured to the underside of said housing, a refractor having a top opening and secured with said closure assembly, the periphery of the top opening of said refractor lying generally in a plane parallel with said other plane and sealingly engaged with said outwardly extending flange about the periphery of the bottom opening of said reflector when the closure assembly is in its operative closed position to tilt adjustably said reflector about its longitudinal axis in order to position said reflector in its operative position.*

*23. A luminaire comprising a relatively shallow inverted dished housing having an elongated configuration and a bottom opening periphery, a relatively deep inverted dished reflector having a bottom opening periphery and being mounted at a position spaced from both ends of said housing, an outwardly extending flange affixed to said reflector about the bottom opening periphery thereof, an aperture in said reflector, lampholding means mounted within said housing and for supporting a light source in said reflector and one end of said reflector, a resilient spring latch mounted one one of said housing and said reflector generally opposite from said reflector aperture, a catch mounted on the other of said housing and said reflector and engaged by said resilient latch, said lampholding means and said catch providing at least a two-point support for said reflector with all portions of the bottom peripheral opening of said reflector and said flange spaced from the bottom opening of said housing, the bottom opening periphery of said reflector being located at least partially beneath the bottom opening periphery of said housing and angularly displaced with respect thereto, an at least partially light-transmitting closure assembly hingedly secured to said housing, said closure assembly having an outer rim portion covering the bottom opening periphery of said housing, said closure assembly in addition having an inner ring-shaped portion angularly displaced with respect to said outer rim portion and engaging said outwardly extending flange about the bottom opening periphery of said reflector to tilt adjustably said reflector about its longitudinal axis in order to position said reflector in its operative position, and said reflector and said closure assembly cooperating to form a weatherproof enclosure for the luminaire optical system.*

References Cited by the Examiner

The following references, cited by the Examiner, are of record in the patented file of this patent or the original patent.

UNITED STATES PATENTS

| | | | |
|---|---|---|---|
| 1,320,174 | 10/19 | Recker | 240—105 |
| 1,761,528 | 6/30 | Fyrberg | 240—41.5 |
| 2,169,181 | 8/39 | Kost | 85—36 |
| 2,289,160 | 7/42 | Yost | 240—25 |
| 2,489,076 | 11/49 | Bjontegard | 240—25 |
| 2,584,671 | 2/52 | Cator et al. | 240—11.4 |
| 2,612,600 | 9/52 | Yonkers | 240—25 |
| 2,677,147 | 5/54 | Phillips | 66—174 |

(Other references on following page)

UNITED STATES PATENTS

| | | | |
|---|---|---|---|
| 2,717,307 | 9/55 | Bjontegard | 240—51.11 |
| 2,732,483 | 1/56 | Elmer | 240—25 |
| 2,767,307 | 10/56 | McGinty et al. | 240—78 |
| 2,778,929 | 1/57 | Loehr | 240—25 |
| 2,833,916 | 5/58 | Foulds | 240—25 |
| 2,840,690 | 6/58 | Harling | 240—25 |
| 2,840,691 | 6/58 | Bobrick | 240—78 |
| 2,849,574 | 8/58 | Burns et al. | 200—118 |
| 2,908,745 | 10/59 | Appleton | 174—81 |
| 2,908,809 | 10/59 | Beach et al. | 240—25 |
| 2,913,200 | 11/59 | Paine et al. | 206—45.19 |
| 2,914,332 | 11/59 | Cervini | 279—83 |
| 2,914,657 | 11/59 | Akely et al. | 240—3 |
| 2,945,945 | 7/60 | Rex | 240—25 |
| 2,970,222 | 1/61 | Husby | 250—239 |
| 2,974,219 | 3/61 | Husby | 240—25 |

OTHER REFERENCES

Westinghouse Pub. "Type OV-35 Luminaire and Mounting," Renewal Parts Data 60-156 AL, page 1, Feb. 1, 1957.

References Cited by the Applicant

UNITED STATES PATENTS

| | | |
|---|---|---|
| 1,417,123 | 5/22 | Wood. |
| 1,436,655 | 11/22 | Halvorson. |
| 1,483,306 | 2/24 | Julin et al. |
| 1,494,477 | 5/24 | Glossop. |
| 1,589,760 | 6/26 | Kuen. |
| 1,836,845 | 12/31 | Halvorson. |
| 2,136,286 | 11/38 | Diez. |
| 2,337,833 | 12/43 | Pahl. |
| 2,534,992 | 12/50 | Reid. |
| 2,615,084 | 10/52 | Diebold. |
| 3,043,950 | 7/62 | Keck. |

FOREIGN PATENTS

| | | |
|---|---|---|
| 936,802 | 12/55 | Germany. |
| 380,971 | 19/32 | Great Britain. |

OTHER REFERENCES

GEC Bulletin Z8430, April 1957.

NORTON ANSHER, *Primary Examiner.*